July 26, 1966 R. L. DURRETT 3,263,177

A.C. COUPLED AMPLIFIER OFFSET STORAGE AND RESET CIRCUIT

Filed June 26, 1963

INVENTOR.
RICHARD L. DURRETT

BY Samuel B. Stone

ATTORNEY

United States Patent Office 3,263,177

Patented July 26, 1966

3,263,177

A.C. COUPLED AMPLIFIER OFFSET STORAGE AND RESET CIRCUIT

Richard L. Durrett, Los Angeles, Calif., assignor to Beckman Instruments, Inc., a corporation of California Filed June 26, 1963, Ser. No. 290,780
3 Claims. (Cl. 330—9)

Figures 1, 2A, 2B:
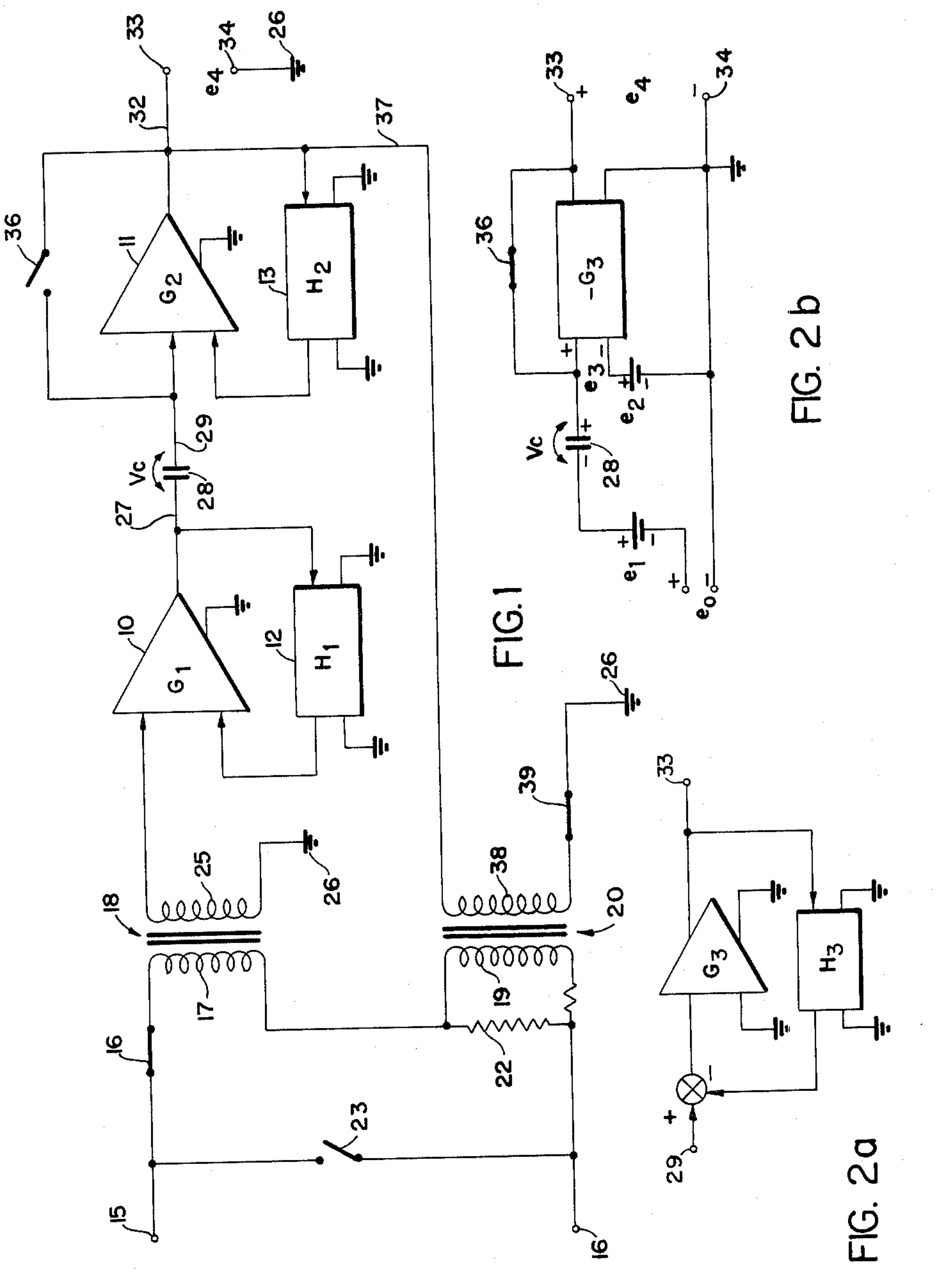

This invention relates to an A.C. coupled amplifier offset storage and reset circuit and more particularly to a reset circuit for resetting an amplifier.

In high accuracy data systems offset voltages and drift voltages are encountered which limit the accuracy of individual circuits and the overall system. The term "offset voltage" may be defined by specifying the offset voltage referred to the input for example, to be the voltage required across the input terminals to yield zero volts across the output terminals. One example of such offset voltages and drifts are those encountered in an amplifier circuit and caused by storage elements such as capacitances, offset voltages of transistors, etc. In order to provide an exact replica of an input signal, such offset voltages must in some way be subtracted.

In one prior arrangement for resetting a circuit to eliminate certain offset or spurious voltages, a capacitor is employed to store a particular voltage which subsequently is subtracted from an input signal. In this prior arrangement, one plate of the capacitor periodically is connected to ground to thereby periodically establish a ground reference. Such an arrangement can correct only for the offset of an associated amplifier and cannot correct for other offsets associated with the circuit. Additionally the prior art arrangement requires a relatively large capacitor which prevents a fast reset time constant.

According to a feature of the present invention, a reset circuit for an amplification system is provided wherein the amplification system may be reset upon command to equal the input voltage present which may be a combination of a plurality of offset or drift voltages.

An additional feature of the present invention is the provision of a reset arrangement for an amplifier wherein a relatively small capacitor is employed to rapidly store an offset voltage.

In a specific exemplary embodiment of a reset circuit constructed in accordance with the teachings of the present invention, a small capacitor is interposed between a preamplifier and a post amplifier. The two amplifiers comprise an over-all potentiometric feedback amplifier in which the input is conductively and electrostatically isolated from the output thereof. A reset switch is connected in parallel around the post amplifier, whereby an offset voltage may be stored by the capacitor upon command to equal the input voltage present. When a signal subsequently is applied to the overall amplifier, the offset voltage stored on the capacitor effectively is subtracted therefrom (amplified differentially, so to speak). Thus, the amplified output signal is a true replica of the input signal since the offset voltages that are added to the input signal by the associated amplifier circuitry are effectively subtracted by means of the offset voltage previously stored on the reset capacitor.

Other features and objects of the invention will be better understood from a consideration of the following detailed description when read in conjunction with the attached drawing in which:

FIG. 1 illustrates an amplifier incorporating a reset circuit constructed in accordance with the concepts of the present invention; and FIGS. 2*a* and 2*b* are circuits employed in providing a mathematical analysis of the concepts of the present invention.

Referring now to the drawing, therein is shown a simplified form of a pulse amplifier for amplifying signals in a range from near D.C. to many thousands of cycles. An amplifier of this nature is shown and described in greater detail in co-pending U.S. patent application Serial No. 290,779 entitled "A.C. Coupled Pulse Amplifier With Floating Input and Grounded Output," filed by Berneike et al. concurrently herewith and assigned to the assignee of the present invention. The amplifier shown in the drawing is a precision data amplifier having its input conductively and electrostatically isolated from its output. The overall amplifier includes a preamplifier 10, designated $A_1$, and a post amplifier 11, designated $A_2$. Feedback networks 12 and 13, designated respectively $H_1$ and $H_2$, are connected around the amplifiers 10 and 11, respectively. Exemplary circuits for the amplifiers 10 and 11 and feedback networks 12 and 13 are shown and described in said co-pending application.

Input signals to be amplified are applied to input terminals 15 and 16. The input terminal 15 is connected through a switch 16 to a primary winding 17 of an input, or error junction, transformer 18. A lower terminal of the primary winding 17 is connected to an upper terminal of a secondary winding 19 of a feedback transformer 20. The lower terminal of the secondary winding 19 is connected through a resistance to the input terminal 16, and a resistance 22 is connected in parallel with the secondary winding 19. A shorting switch 23 is connected across the input terminals 15 and 16 for purposes to be described hereinafter.

A secondary winding 25 of the transformer 18 has one terminal grounded at 26 and another terminal connected to an input of the amplifier 10. The output of the amplifier 10 is connected through a line 27, a reset capacitor 28 and a line 29 to an input of the amplifier 11. The capacitor 28 typically may have a value of .5 microfarad. The output of the amplifier 11, which provides the output of the overall amplifier, is connected through a line 32 to an output terminal 33. Output signals are are derived between the terminal 33 and a terminal 34 which is connected to ground at 26. A reset switch 36 is connected around the amplifier 11 for resetting the overall amplifier as will be described in greater detail subsequently. This switch, as well as the other switches described herein, may be a transistor switch. A line 37 is connected from the output of th eamplifier 11 to a primary winding 38 of the transformer 20. A lower terminal of the primary winding 38 is connected through a switch 39 to ground 26. The line 37 and the transformer 20 provides feedback around the overall amplifier shown in the drawing.

The switches 16, 23, 36 and 39 are operated in a desired sequence to provide three periods of operation; (1) reset, (2) signal, and (3) discharge. The reset period resets the amplifier by storing offset voltages on the capacitor 28 so that these offset voltages subsequently will be subtracted from an input signal applied to the input terminals 15 and 16 which is being amplified. During the signal period, the input signal is amplified. During the discharge period, any excitation currents which may have been built up are allowed to discharge.

During the reset period, the switches 16, 23, 36 and 39 are closed. During the signal period, only the switches 16 and 39 are closed. During the discharge period, only the switches 23 and 36 are closed (the only requirement being that either the switch 16 or 23 be open, and the switch 39 be open) in preparation for the next following reset period. Only the reset period is involved in the present invention, and if desired a more detailed discussion of the other periods of operation of the present amplifier may be gleaned from a consideration of the aforementioned copending application. Additionally, each of the transformers 18 and 20 includes a plurality of shields in order to provide for more precise transfer of signals, provide high common-mode rejection, etc. A more detailed explanation of such shielding also may be found in the aforementioned co-pending application if desired.

The preamplifier 10 has a low output impedance in order to allow rapid charging of the reset capacitor 28. The post amplifier 11 is an inverting amplifier and has a high input impedance to allow the reset capacitor 28 to have a small capacitance to provide a fast reset time constant and yet not roll off at low frequencies during the signal period. Additionally, the amplifier 11 is set to have a low offset voltage of its own. This may be accomplished by adjusting a bias potentiometer therein as discussed in greater detail in said co-pending application.

By employing the preamplifier 10 in conjunction with the reset capacitor and the post amplifier 11, it is possible to use a smaller value of capacitance for the reset capacitor for the same reset time constant than would be provided if the preamplifier 10 were not present. The use of a preamplifier 10 having a low output impedance preceding the capacitor 28 allows for a much faster reset time constant than would be possible without the preamplifier 10. Since the output of the amplifier 10 absorbs the reset currents from the capacitor 28, it is not required to use a shorting switch from the line 27 to ground in order to establish new references. This factor is very important when energy storage elements (inductances and capacitances) are present in the feedback network, because the circuit can be reset to the signal present on the input and not to ground as is necessary without the preamplifier 10. Any offset voltages (which may include offsets in the feedback network) appearing on the line 27 and connected to the left-hand plate of the reset capacitor 28 are stored on the capacitor during reset.

As noted previously, when a signal is being amplified the switches 16 and 39 are closed and the switches 23 and 36 are open. Thus, an input signal applied to the input terminals 15 and 16 is amplified, and the amplified output signal is derived from the output treminals 33 and 34. At the end of a signal period, the switches 16 and 39 are opened in order to allow any excitation currents that may have built up in the transformers 18 and 20 to decay. The amplifier is reset by closing the reset switch 36. At this time the switches 16, 23 and 39 also are closed. No input signal is applied to the input terminals 15 and 16 at this time. The amplifier 11 functions as an operational amplifier and the capacitor 28 charges to a value which causes an output voltage of zero across the output terminals 33 and 34. After the capacitor 28 has charged to an offset voltage which provides a zero output across the terminals 33 and 34, the reset switch 36 is opened, the shorting switch 23 is opened and the switches 16 and 39 are closed. A signal is applied to the input terminals 15 and 16 and is amplified. Since the offset voltage has been stored on the capacitor 28, the offset voltage added to the input signal during this signal period is subtracted therefrom to thereby provide a precise amplified replica at the output terminals 33 and 34 of the input signal applied to the input terminals 15 and 16. In other words, an offset voltage is stored on the capacitor 28 so that a new input signal applied to the terminals 15 and 16 is amplified differentially, so to speak, with the input signal that was present during the reset cycle. Thus, any input offsets and the offset voltage of the amplifier 10 are effectively eliminated from the output signal appearing across the output terminals 33 and 34 thereby providing a precise amplified replica of the input signal applied to the input terminals 15 and 16.

The following mathematical analysis of the operation of the amplifier reset concepts of the present invention may further the understanding thereof. $G_2$ and $H_2$ are always interconnected regardless of the on-off condition of switch 36. From feedback theory $G_2$ and $H_2$ may be combined to form the equivalent forward functional link, $G_2/1+G_2H_2$ which may be termed $G_3$ as illustrated in FIG. 2*a*. When switch 36 is considered, it can be treated as a feedback network $H_3$ connected around $G_3$ to give the block diagram shown in FIG. 2a. For $H_3=+1$ (when switch 36 is closed), the equivalent circuit is as shown in FIG. 2*b*. After the capacitor 28 has charged, $$V_C=-e_0-e_1+e_2+e_3 \qquad (1)$$

where $e_0$=the input signal voltage referred to the output of $G_1$ but is zero by definition when switch 36 is closed (no input signal is applied to terminals 15 and 16 of FIG. 1 at this time), $e_1$=the offset voltages referred to the output of $G_1$, $e_2$=the offset voltage of $G_3$ referred to the input of $G_3$, and $e_3$=the error voltage at the input of $G_3$.

However, at the time $e_0$ is equal to zero, and therefore, $$V_C=-e_1+e_2+e_3 \qquad (2)$$

The value of $e_3$ in terms of $e_2$ is simply obtained from feedback theory as $$e_3=-e_2+e_4 \qquad (3)$$

but $$e_4=-e_3\,G_3 \qquad (4)$$

therefore, by substituting into Equation 3 for $e_4$, $$e_3=-e_2-e_3G_3=-\frac{e_2}{1+G_3} \qquad (5)$$

Substituting $e_3$ as given in Equation 5 into Equation 2 gives $$V_C=-e_1+e_2-\frac{e_2}{1+G_3} \qquad (6)$$

which expresses the offset voltages stored on the capacitor 28 during reset.

For $H_3=0$ (when switch 36 is open), the error voltage at the input of $G_3$ now becomes $$e'_3=e'_0+e_1-e_2+V_C \qquad (7)$$

and $e'_0$ is not now necessarily zero.

Upon substitution for $V_C$ from Equation 6 which was derived when switch 36 was closed $$e'_3=e'_0+e_1-e_2-e_1-e_2-\frac{e_2}{1+G_3}$$

$$=e'_0-\frac{e_2}{1+G_3} \qquad (8)$$

When referred to the output of $G_3$, simply multiply by $-G_3$ to obtain $$e_4=-e'_3G_3=-e'_0G_3+e_2\frac{G_3}{1+G_3} \qquad (9)$$

but $G_3 \gg 1$ at D.C., and therefore, $$e_4=-e'_0\,G_3+e_2 \qquad (10)$$

which is the output signal with an offset $e_2$. Hence, it will be seen from Equation 10 that if $e_2$ is made substantially equal to zero by adjusting the offset voltage of the amplifier 11, the output voltage ($e_4$) provided when an input voltage $e'_0$ is amplified is equal to $-e'_0G_3$. The cancellation of $e_2$ may be provided by adjusting an offset potentiometer connected with the emitter of a first transistor in the amplifier 11 as discussed in said co-pending application, or in any other desirable way (as by adding a voltage equal and opposite to $e_2$ by means of a battery or the like).

It now should be apparent that the present invention provides a reset circuit and method of resetting an amplifier so as to eliminate the effects of offset voltages therein when subsequently amplifying an input signal.

Although an exemplary embodiment of the present invention has been disclosed and discussed, it will be understood that other applications and circuit arrangements are possible and that the embodiment disclosed may be subjected to various changes, modifications and substitutions without necessarily departing from the spirit of the invention.

What is claimed is:

1. In a potentiometric feedback amplifier including a preamplifier having first and second input and first and second output terminals and having a feedback network connected between said input and output terminals, a post amplifier having first and second input and first and second output terminals and a feedback network connected between said second input and first output terminals of said post amplifier, the input terminals of said preamplifier serving as the input terminals of the potentiometric feedback amplifier, and the output terminals of said post amplifier serving as the output terminals of said potentiometric feedback amplifier, the improvement comprising a capacitor connected in series between an output terminal of said preamplifier and said first input terminal of said post amplifier, and a switch connected between said first output terminal of said post amplifier and said first input terminal of said post amplifier, whereby said capacitor serves to store offset voltages in said potentiometric feedback amplifier to cause the output voltage across the output terminals thereof to equal substantially zero when said switch is closed.

2. A circuit of the character described including a preamplifier having first and second input terminals, an output terminal and a common terminal, a feedback network having input, output and common terminals, the output terminal of said preamplifier being connected to the input terminal of said feedback network, the output terminal of said feedback network being connected to the second input terminal of said amplifier, the first input terminal of said preamplifier and the common terminal of said feedback network comprising the input to said circuit, a post amplifier having first and second input terminals, an output terminal and a common terminal, a second feedback network having input, output and common terminals, the output terminal of said post amplifier being connected to the input terminal of said second feedback network, the output terminal of said second feedback network being connected to the second input terminal of said post amplifier, the improvement comprising a capacitor connected in series between the output terminal of said preamplifier and the first input terminal of said post amplifier, and switch means connected between the output terminal of said post amplifier and the first input terminal thereof, whereby when said switch means is in a closed state said capacitor charges to a voltage to cause the output voltage across the output terminals of said post amplifier to equal substantially zero, and when said switch means is in an open state the charge on said capacitor is subtracted from any signal passed by said amplifiers.

3. A circuit as defined in claim 2 wherein said post amplifier has an offset voltage of substantially zero.

References Cited by the Examiner

UNITED STATES PATENTS

| | | | |
|---|---|---|---|
| 3,047,797 | 7/1962 | Borsboom | 330—9 X |
| 3,105,158 | 9/1963 | Nichols | 307—88.5 |
| 3,116,458 | 12/1963 | Margopoulis | 328—151 X |
| 3,139,590 | 6/1964 | Brown | 330—51 X |
| 3,158,759 | 11/1964 | Jasper | 328—151 X |

ROY LAKE, *Primary Examiner.*

R. P. KANANEN, *Assistant Examiner.*